United States Patent
Sharabani et al.

(10) Patent No.: US 10,621,337 B1
(45) Date of Patent: Apr. 14, 2020

(54) APPLICATION-TO-APPLICATION DEVICE ID SHARING

(71) Applicant: Symantec Corporation, Mountain View, CA (US)

(72) Inventors: Adi Sharabani, Palo Alto, CA (US); Yair Amit, Tel-Aviv (IL); Daniel Kandel, Tel-Aviv (IL)

(73) Assignee: CA, Inc., San Jose, CA (US)

( * ) Notice: Subject to any disclaimer, the term of this patent is extended or adjusted under 35 U.S.C. 154(b) by 162 days.

(21) Appl. No.: 15/787,104

(22) Filed: Oct. 18, 2017

Related U.S. Application Data

(60) Provisional application No. 62/409,461, filed on Oct. 18, 2016.

(51) Int. Cl.
| | |
|---|---|
| *G06F 21/53* | (2013.01) |
| *G06F 21/12* | (2013.01) |
| *H04W 4/02* | (2018.01) |
| *G06F 21/62* | (2013.01) |
| *G06F 16/00* | (2019.01) |

(52) U.S. Cl.
CPC ............ *G06F 21/53* (2013.01); *G06F 21/121* (2013.01); *G06F 21/62* (2013.01); *H04W 4/02* (2013.01); *G06F 16/00* (2019.01); *G06F 2221/2113* (2013.01)

(58) Field of Classification Search
CPC ........ G06F 21/53; G06F 21/62; G06F 21/121; G06F 16/00; G06F 2221/2113; H04W 4/02

See application file for complete search history.

(56) References Cited

U.S. PATENT DOCUMENTS

| | | | |
|---|---|---|---|
| 2006/0070129 A1* | 3/2006 | Sobel | H04L 63/105 726/23 |
| 2006/0075140 A1* | 4/2006 | Sobel | H04L 63/105 709/245 |
| 2012/0173870 A1* | 7/2012 | Reddy | H04L 63/0428 713/153 |
| 2014/0006347 A1* | 1/2014 | Qureshi | H04L 63/20 707/621 |

(Continued)

OTHER PUBLICATIONS

Bojinov et al., "Mobile Device Identification via Sensor Fingerprinting," https://crypto.stanford.edu/gyrophone/sensor_id.pdf, 14 pages.

*Primary Examiner* — J. Brant Murphy
(74) *Attorney, Agent, or Firm* — FisherBroyles, LLP

(57) ABSTRACT

Systems and methods are provided for sharing a device identifier between two applications installed on an unmanaged device. An enterprise application running on a device may execute client-side code received from an ID matching server to generate a target data set characterizing the device. The enterprise application may send the target data set to the ID matching server. The ID matching server may interact with a Mobile Threat Defense (MTD) server to determine a device ID that the MTD server may use to identify the device. The ID matching server may send the device identifier to an Identity Management (IdM) server. The IdM server may send an API request for security information about the target device to the MTD server, which may send the requested security information in response. The IdM server may determine an authorization level based on the security information.

17 Claims, 6 Drawing Sheets

(56) References Cited

U.S. PATENT DOCUMENTS

| | | | | |
|---|---|---|---|---|
| 2014/0006772 A1* | 1/2014 | Qureshi | .................. | H04L 63/20 |
| | | | | 713/150 |
| 2014/0007048 A1* | 1/2014 | Qureshi | .................. | H04L 63/20 |
| | | | | 717/110 |
| 2014/0007183 A1* | 1/2014 | Qureshi | .................. | H04L 63/20 |
| | | | | 726/1 |
| 2014/0007193 A1* | 1/2014 | Qureshi | .................. | H04L 63/20 |
| | | | | 726/3 |
| 2014/0007222 A1* | 1/2014 | Qureshi | .................. | H04L 63/20 |
| | | | | 726/16 |
| 2014/0297839 A1* | 10/2014 | Qureshi | ............. | H04L 12/2856 |
| | | | | 709/224 |
| 2017/0070484 A1* | 3/2017 | Kruse | ....................... | H04L 9/14 |
| 2017/0317984 A1* | 11/2017 | Ollikainen | .......... | G06F 21/6254 |
| 2019/0141030 A1* | 5/2019 | Cockerill | ............ | H04L 63/0853 |

* cited by examiner

APPLICATION-TO-APPLICATION DEVICE ID SHARING

CROSS-REFERENCE TO RELATED APPLICATIONS

This application claims benefit of U.S. Provisional Patent Application No. 62/409,461, entitled "App-to-App Device ID Sharing," filed Oct. 18, 2016, the contents of which are hereby incorporated by reference.

BACKGROUND

Field

The present disclosure relates to a system for application-to-application device ID sharing. More specifically, the present disclosure provides systems and methods for sharing a device identifier between two applications installed on an unmanaged device.

Description of the Related Art

Enterprise applications (EAs) typically involve large software-system platforms designed to operate in corporate environments. In general, EA platforms are complex, scalable, component-based, and distributed. EA software is often an important component of computer-based information systems. EA software can increase efficiency and productivity through business-level support functionality.

Application Programming Interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call), queries encapsulated in a Hyper-Text Transfer Protocol (HTTP) POST request, a Simple Object Access Protocol (SOAP) request, or other protocols that allow client software to invoke functions on a remote system.

SUMMARY

One embodiment presented herein describes a method for operating a device-ID matching system. This method generally includes receiving, via a network from a first server, a message that includes a user identifier for a user and a target data set collected by an enterprise application running on a target computing device, wherein the target data set characterizes the target computing device; determining a device identifier associated with the target computing device based on the user identifier and the target data set; sending the device identifier to the first server via the network in response to the message; receiving, from a second server via the network, a request for one or more security values associated with the target computing device, wherein the request includes the device identifier; determining the one or more security values based on a device profile associated with the device identifier; and sending the one or more security values to the second server via the network in response to the request to enable the second server to determine an authorization level for the user that applies to the enterprise application. The first server and the second server may be different servers or the same server.

Another embodiment presented herein describes a system. The system generally includes a processor and a memory storing program code that, when executed on the processor, performs operations for correlating and sharing a device identifier between two applications installed on an unmanaged device. The operations generally include receiving, via a network from a first server, a message that includes a user identifier for a user and a target data set collected by an enterprise application running on a target computing device, wherein the target data set characterizes the target computing device; determining a device identifier associated with the target computing device based on the user identifier and the target data set; sending the device identifier to the first server via the network in response to the message; receiving, from a second server via the network, a request for one or more security values associated with the target computing device, wherein the request includes the device identifier; determining the one or more security values based on a device profile associated with the device identifier; and sending the one or more security values to the second server via the network in response to the request to enable the second server to determine an authorization level for the user that applies to the enterprise application. The first server and the second server may be different servers or the same server.

Another embodiment presented herein describes a non-transitory computer-readable storage medium storing instructions that, when executed on a processor, perform operations for operating a device-ID matching system. The operations generally include receiving, via a network from a first server, a message that includes a user identifier for a user and a target data set collected by an enterprise application running on a target computing device, wherein the target data set characterizes the target computing device; determining a device identifier associated with the target computing device based on the user identifier and the target data set; sending the device identifier to the first server via the network in response to the message; receiving, from a second server via the network, a request for one or more security values associated with the target computing device, wherein the request includes the device identifier; determining the one or more security values based on a device profile associated with the device identifier; and sending the one or more security values to the second server via the network in response to the request to enable the second server to determine an authorization level for the user that applies to the enterprise application. The first server and the second server may be different servers or the same server.

DETAILED DESCRIPTION

Figure 1:
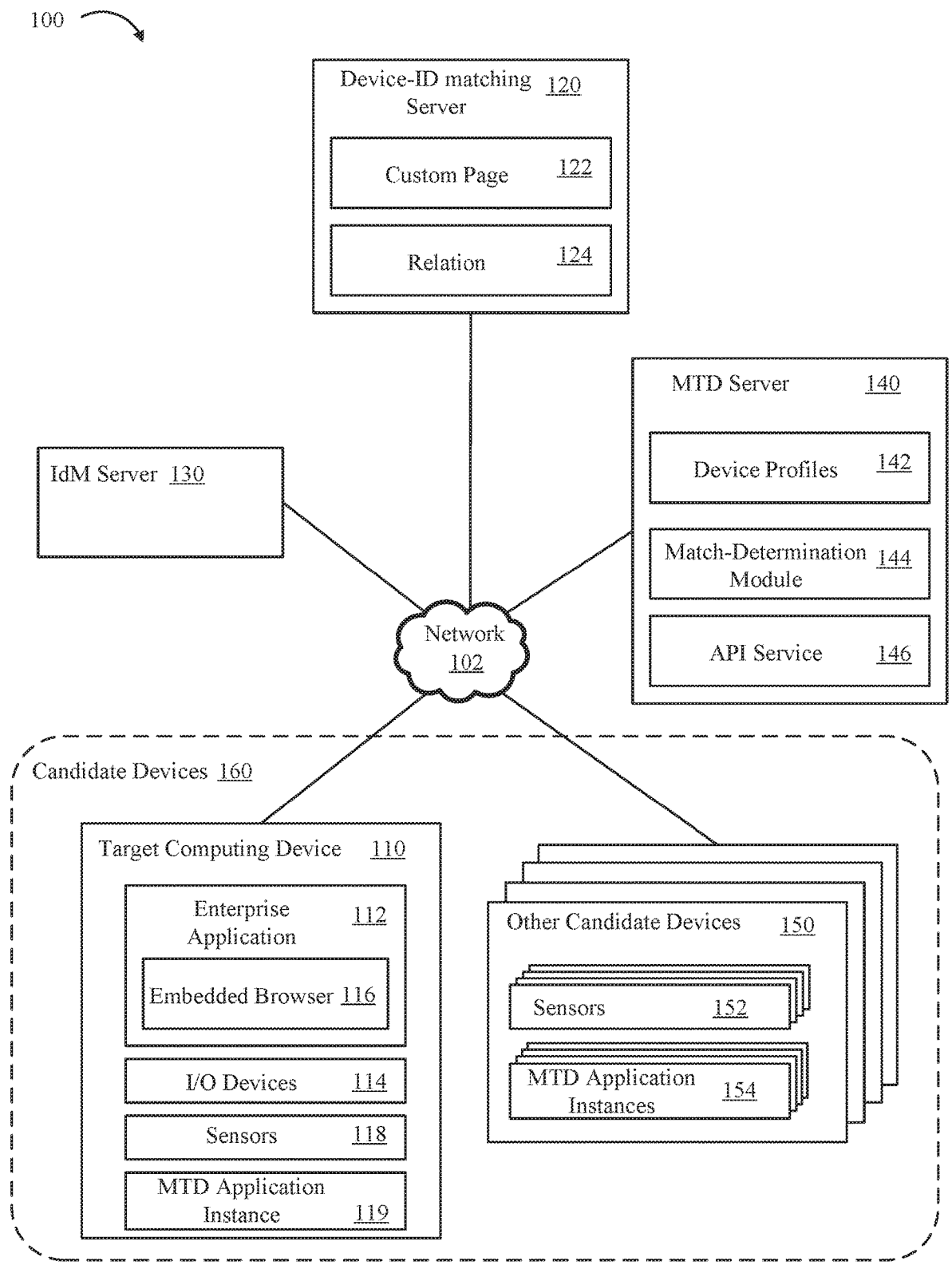
FIG. 1 illustrates a computing environment in which systems of the present disclosure can operate, according to one embodiment.

Integration between two software products installed on a mobile device is most effectively achieved when a single unique identifier (ID) for the device is used by both products. Such a unique identifier enables the two products to exchange information about the device with each other and to trigger operations on the device.

Systems described herein enable a secure login to an enterprise application (e.g., Salesforce™) based on the security status of a mobile device. The systems include an Identity Management (IdM) server that provides single-sign-on options for enterprise applications installed on a mobile device and a Mobile Threat Defense (MTD) product that maintains security information (e.g., a security status and a risk level) for the mobile device. Methods described herein allow the IdM server and the MTD product to share a common device ID so that the MTD product can report security information about the device to the IdM server. The IdM server may limit access to certain services based on the security information.

On some platforms, a device ID can be shared relatively easily. For example, on Android™ devices, a unique device ID may be available for use. Also, in some operating systems (e.g., iOS™ from Apple, Inc. of Cupertino, Calif.), devices can be managed using a device management profile that includes such an identifier. However, for unmanaged devices (e.g., unmanaged iOS devices), inherent operating-system limitations may prevent applications from sharing a common device identifier. In addition, application sandboxing is designed to prevent applications from accessing any data maintained by other applications. Application sandboxing is a software management strategy that isolates applications from certain important system resources and other programs to provide an extra layer of security against malware. Embodiments described herein enable applications on an unmanaged device to use a common device identifier.

Below is a brief description of several entities included in various embodiments described herein.

Mobile Threat Defense (MTD) server: a computer server that provides an Application Programing Interface (API) for retrieving security information associated with a device based a shared identifier of the device.

Identity Management (IdM) server: a computer server that handles identity management requests. The IdM server may authorize access for a device based on information received from the MTD server.

Device-ID Matching server: a computer server that manages a unique ID per device based on information received from the device. This can be implemented as part of the MTD server or as a separate server dedicated for this purpose.

Mobile Threat Defense (MTD) application: a computer program installed on a user device that is configured to analyze the security status of the device and communicates the security status to the MTD server.

Enterprise Application: an application (e.g. Salesforce™) that uses the IdM single-sign-on (SSO) adapter in order to log in the user. In some embodiments, the enterprise application cannot easily be modified for the purpose of integrating with the MTD application. Embodiments described herein allow the enterprise application to participate in application-to-application device-ID sharing without being modified to communicate directly with the MTD application or the MTD server.

FIG. 1 illustrates a computing environment 100 in which systems of the present disclosure can operate, according to one embodiment. As shown, the computing environment 100 includes a network 102, a target computing device 110, a device-identity (ID) matching server 120, an Identity Management (IdM) server 130, and a Mobile Threat Defense (MTD) server 140.

The target computing device 110 may be a mobile device (e.g., a smartphone, a tablet, or a laptop) or some other type of device (e.g., a desktop computer). The target computing device 110 includes input/output (I/O) devices 114 (e.g., a touch screen and a microphone). After a user opens an enterprise application 112 on the target computing device 110, the enterprise application 112 may ask the user to log in. In response, the user may provide authentication credentials (e.g., a user identifier, such as an email address, and/or a password) to the enterprise application 112 via the I/O devices 114.

After receiving the authentication credentials, an embedded browser 116 within the enterprise application 112 may send an authentication request to a location specified by an authentication uniform resource locator (URL) via the network 102. The authentication URL and the authentication request may conform to the Security Assertion Markup Language (SAML) standard.

The authentication URL may correspond to a custom page 122 hosted by the ID matching server 120. Alternatively, the embedded browser 116 may be redirected to the custom page 122 once the authentication credentials for the user are provided to the location specified by the authentication URL. The custom page 122 may include client-side code (e.g., in Javascript) for retrieving characteristics of a device on which the code is executed. In addition, the custom page 122 may also include client-side code for retrieving sensor data from a device on which the code is executed.

After the custom page 122 (including the client-side code) is received at the target computing device 110 via the network 102, the embedded browser 116 may execute the client-side code to retrieve a data set characterizing the target computing device 110. The data set characterizing the target computing device 110 is referred to herein as the target data set. The target data set includes various properties of the target computing device 110. For example, the target data set may include an Internet protocol (IP) address, a user-agent string (e.g., identifying the embedded browser and the operating system running on the target computing device 110), a central processing unit (CPU) class, a model number, a serial number, a screen size, a screen resolution, a pixel ratio, a phone number, a cellular carrier, an International Mobile Equipment Identity (IMEI) number, Mobile Equipment Identifier (MEID), a Cellular Data Number (CDN), an Integrated Circuit Card ID (ICCID) number, and/or other properties (e.g., properties that can be retrieved using the fingerprintjs2 library). In addition, the target data set may include sensor data from the sensors 118. The sensors 118 may include, for example, a global positioning system (GPS), a microphone, and/or an inertial measurement unit (IMU) (e.g., comprising an accelerometer, a gyroscope, and a magnetometer).

After the embedded browser 116 executes the client-side code included in the custom page 122, the enterprise application 112 may send the target data set to the ID matching server 120 via the network 102. The ID matching server 120 may compare the target data set to a relation 124. The relation 124 maps device properties to device identifiers that are jointly used by the IdM server 130 and the MTD server 140. If an entry in the relation 124 maps the target data set to a device identifier for the target computing device 110, the ID matching server 120 may send the device identifier to the enterprise application 112 via the network 102.

The relation 124 can be digitally represented in a number of ways. For example, the relation 124 may be digitally represented by an associative array. An associative array includes a set of key-value pairs. In an associative array, the value of a given key-value pair can be retrieved by providing the key in a manner that conforms to the syntax of the programming language used to implement the associative array. In this example, an associative array that represents the relation 124 has key-value pairs in which each value is a device identifier and each key is derived from information contained in data sets that characterize devices (e.g., the target data set). There are many different ways that a key can be derived from such data sets. For example, if a given data set includes a property that is likely to be unique to the device characterized by the data set (e.g., an IMEI, an MEID, or a serial number), the property (or a combination of the property and the user identifier) may be used as a key. Also, a single key may be derived from multiple properties. For example, several properties may be concatenated together to form a key. Other methodologies for deriving keys from data sets can be used, but it is generally desirable to use a methodology that is unlikely to produce the same key from data sets that characterize different devices.

In another example, the relation 124 may be digitally represented as a table K in a database. In the table K, the device identifiers serve as entries in a primary key column. Properties included in the data sets serve as entries in additional columns of the table K. For example, one row (e.g., record) in table K may have the device identifier as the entry in a primary key column C1, the user identifier as the entry in a second column C2, and the device's model number as the entry in a third column C3. In this example, the ID matching server 120 may retrieve the device identifier via a query that includes the user identifier and the model number. For example, if the user identifier is "JohnDoe123" and a model number included in the target data set is "HG0112358," the query may be depicted as "SELECT C1 FROM K WHERE C2=JohnDoe123 AND C3=HG0112358" in Structured Query Language (SQL).

Regardless of how the relation 124 is implemented, if there is no entry in the relation 124 that maps the target data set to a device identifier, the ID matching server 120 may send the target data set and a user identifier for the user in an API request to a match-determination module 144 for assistance in determining the device identifier for the target computing device 110.

The match-determination module 144 may compare the target data set to device profiles 142 that are associated with the user identifier to determine if any of the device profiles 142 matches the target data set. Each one of the device profiles 142 that includes properties inconsistent with the properties specified in the target data set may be excluded from being considered a match. For example, if the target data set specifies that the target computing device 110 has a CPU class of "x86," any of the device profiles 142 that have a different CPU class (e.g., "68K " or "Alpha") are excluded. If there is a single matching profile found in the device profiles 142, the match-determination module 144 may conclude that the target computing device 110 is the device described by the matching profile and send a device identifier found in the matching profile to the ID matching server 120 in response to the API request.

However, if more than one of the device profiles 142 matches the target data set, the match-determination module 144 may send a message via the network 102 to each of the candidate devices 160 (i.e., the devices whose corresponding profiles match the target data set). As shown, the candidate devices 160 include the target computing device 110 and other candidate devices 150. The message may be received by an instance of a client-side Mobile Threat Defense (MTD) application running locally on each of the candidate devices 160. For example, MTD application instance 119 may receive the message at the target computing device 110, and MTD application instances 154 may receive the message at the other candidate devices 150.

The message may request that each of the candidate devices 160 retrieve a corresponding candidate data set that characterizes the respective candidate device. In one embodiment, candidate data sets include the same type of information as the target data set so that a meaningful point-by-point comparison can be made between each candidate data set and the target data set (which was collected by the enterprise application 112).

In one embodiment, the message may contain code similar or identical to the client-side code from the custom page 122 that was executed by the embedded browser 116 to retrieve the target data set. In this example, after the MTD application instance 119 receives the message, the MTD application instance 119 may execute the code to retrieve the candidate data set that characterizes the target computing device 110. Similarly, MTD application instances 154 may execute the code to retrieve the candidate data sets for the other candidate devices 150. If sensor data is included in the target data set, sensors 118 and sensors 152 may collect the corresponding sensor data for MTD application instance 119 and MTD application instances 154, respectively. Since the target data set was collected on the target computing device 110 (though by the enterprise application 112 rather than the MTD application instance 119), the candidate data set collected by the MTD application instance 119 will match the target data set.

Next, the MTD application instance 119 and the MTD application instances 154 may send the candidate data sets gathered, respectively, to the match-determination module 144 in response to the message. After the candidate data sets have been received, the match-determination module 144 may compare the candidate data sets to the target data set to determine which of the candidate data sets matches the target data set.

The manner in which the match-determination module 144 determines which candidate data set is a match set may vary depending on the type of information included in the target data set and the candidate data sets. In one embodiment, properties and sensor data included in the target data set may be compared to corresponding properties and sensor data included in each candidate data set to determine if any of the candidate data sets is an exact match for the target data set. However, this verbatim approach may be ineffective in scenarios where sampling error may obfuscate comparisons between sensor data. Also, some properties in the data sets may be based on configurations that can occasionally change (e.g., time zone, language, or screen resolution). While the delay between the time when the target data set is collected and the time when the candidate data sets are collected is miniscule (e.g., generally no more than a few seconds), a change in such a property during the delay could cause a legitimate candidate data set to be incorrectly excluded.

As a result, in other embodiments, the comparison between the target data set and the candidate data sets is made in a manner that is more robust to sampling error for sensor data and unexpected configuration changes. In one example, a match score is calculated for each candidate data set, respectively. The match score measures the similarity between the corresponding candidate data set and the target data set. Once all match scores have been calculated, the candidate data set with the best match score (i.e., the match score indicating the highest degree of similarity to the target data set) may be designated as the match for the target data set if the best match score meets a predefined threshold. Different embodiments may use different processes for determining the match scores. An illustrative, non-limiting example is provided below.

In one example, the match-determination module 144 compares static properties that generally do not change (e.g., model number, a serial number, or screen size) first. If a candidate data set differs from the target data set with respect to any of the static properties, the match-determination module 144 assigns the candidate data set a match score that does not meet the predefined threshold without performing any additional analysis. Otherwise, the match-determination module 144 compares any additional properties found in the target data set and the candidate data set. If an additional property in the candidate data set equals the corresponding property in the target data set, the match-determination module 144 may add a benefit value to the match score for the candidate data set. If a candidate data set differs from the target data set with respect to one of the additional properties, the match-determination module 144 may add a penalty value to the match score for the candidate data set. The penalty value may be based on a probability that the property could have changed one or more times on the target device during the delay between the time the target data set was collected and the time the candidate data set was collected. Such a probability may be determined based on a Poisson distribution, as shown in the example expression below:

$$\sum_{k=1}^{n} \frac{\lambda^k e^{-\lambda}}{k!}$$

In this expression, $\lambda$ is the expected number of changes to the property over the time interval between when the target data set is collected and when the candidate data set is collected (which is usually much less than one for properties that change rarely), k is an integer index ranging from one to n, n is an integer greater than or equal to one (and small enough to avoid an arithmetic overflow error on the MTD server 140), and e is the base of the natural logarithm. When a property of the candidate data set is not equal to the corresponding property of the target data set, the magnitude of the applicable penalty value may be inversely proportional to the probability.

If sensor data is also available, the match-determination module 144 may also compare the sensor data. Some types of sensor data may be compared point by point. For example, if the sensors 118 include a GPS that provides longitude and latitude coordinates, the match-determination module 144 may compare a longitude coordinate from the target data set to a longitude coordinate from a candidate data set. If the difference is less than a first threshold, the match-determination module 144 may add a benefit value to the match score for the candidate data set to indicate that the longitude coordinates are a match. However, if the difference exceeds the first threshold, the MTD server 140 may reduce the benefit value in proportion to the amount by which the difference exceeds the first threshold. If the difference exceeds a second threshold, the match-determination module 144 may add a penalty value to the match score. For example, the value V(d) added to the match score may be defined according to the following function:

$$V(d) = \begin{cases} B, & d \leq t_1 \\ B[1 - C_1^{-C_2(d-t_2)}], & t_1 < d \leq t_2 \\ P, & d > t_2 \end{cases}$$

In this example function, d is the difference between the two sensor values (e.g., the longitude coordinates), B is a predefined constant representing the highest possible benefit value that can be added to the match score based on the comparison between the two sensor values, P is a predefined constant representing the penalty value, $t_1$ is the first threshold, $t_2$ is the second threshold, $C_1$ is a predefined constant greater than zero and less than one, and $C_2$ is a predefined constant greater than zero.

After the match-determination module 144 has determined match scores for each candidate device, the match-determination module 144 may retrieve the device identifier for the candidate device with the best match score from the device profiles 142 and send the device identifier to the ID matching server 120 in response to the API request. In this example, the device identifier corresponds to the target computing device 110.

Typically, the match-determination module 144 may determine the device identifier for the target computing device without additional action from the enterprise application 112. However, in very rare cases, there may be more than one device associated with the user that matches the target data set. In such cases, the match-determination module 144 may send a notification to the device-ID matching server 120 indicating that the device identifier could not be determined based on the target data set. The device-ID matching server 120 may send a message to the enterprise application 112 that triggers the embedded browser 116 to launch the client-side MTD application instance 119 (e.g., via a URL handler) to assist in determining the device identifier. The MTD application instance 119 may send a communication to the match-determination module 144 indicating that the enterprise application 112 is running on the same device as the MTD application instance 119 that sent the communication. Based on the communication, the match-determination module 144 can determine the device identifier for the target computing device.

After receiving the device identifier, the ID matching server 120 may redirect the authentication request to the IdM server 130. The device identifier and the user identifier may also be sent to the IdM server 130 along with the authentication request.

After receiving the device identifier, the IdM server 130 may send an API call with the device identifier to an API service 146 to request security information about the target computing device 110. The API service 146 may use the device identifier to look up the profile in the device profiles 142 for the target computing device 110. The requested security information for the target computing device 110 may be found in the profile.

Depending on the embodiment, there are many types of security information that may be requested. For example, the security information may include security values that represent aspects of the target computing device 110 that may be relevant to device security, such as the type of operating system executing on the target computing device 110, whether the operating system is the latest version available, whether the operating system is configured to receive and install updates automatically, whether an antivirus program is installed on the target computing device 110, whether the user is logged in to the target computing device 110 through a guest account or an administrative account, whether the target computing device 110 is connected to a public wireless network, whether certain types of applications (e.g., keyloggers) are installed on the target computing device 110, whether remote assistance is enabled on the target computing device 110, whether the target computing device 110 is configured to back up local data through a cloud service, and/or whether a firewall is actively protecting the target computing device 110.

The requested security information may also include other security values, such as counts of security events on the target computing device 110 that may indicate a malware infection. Some examples of security events that may indicate a malware infection include storing suspicious files, modifying certain files (e.g., hidden system files), deleting certain files, changing registry entries, running suspicious processes, playing sounds under unusual circumstances, opening dialog boxes, receiving suspicious messages over the network 102, freezing, crashing, running slowly in general, disabling certain types of applications (e.g., antivirus programs), creating new desktop icons without user consent, changing system security settings, opening or closing programs without user consent, sending emails to multiple recipients without user approval, showing pop-up advertisements, changing a default search engine without user approval, installing new toolbars in a web browser, executing macros, redirecting to a web page other than a web page indicated by a link that is clicked, increasing the number of processes that are running, disabling a firewall, and/or changing a hard drive's name or a volume's name.

After the security information is retrieved from the profile for the target computing device 110, the API service 146 may send the security information to the IdM service 130 in response to the API call. The IdM server 130 may analyze the security information about the target computing device 110 to determine an authorization level to apply to the user for the enterprise application 112. The authorization level may specify that the user has full access, partial access, or no access to electronic resources (e.g., functionality or data) made available through the enterprise application 112. The IdM server 130 may send an indication of the authorization level to the enterprise application 112 via the network 102. The enterprise application 112 may enforce the authorization level accordingly.

While FIG. 1 depicts the device-ID matching server 120 and the MTD server 140 as separate units, the device-ID matching server 120 and the MTD server 140 may be consolidated into a single functional unit in some embodiments. In embodiments where the device-ID matching server 120 and the MTD server 140 are consolidated, the some network communications described herein between the device-ID matching server 120 and the MTD server 140 may be replaced by communications between modules within the consolidated functional unit.

Figure 2:
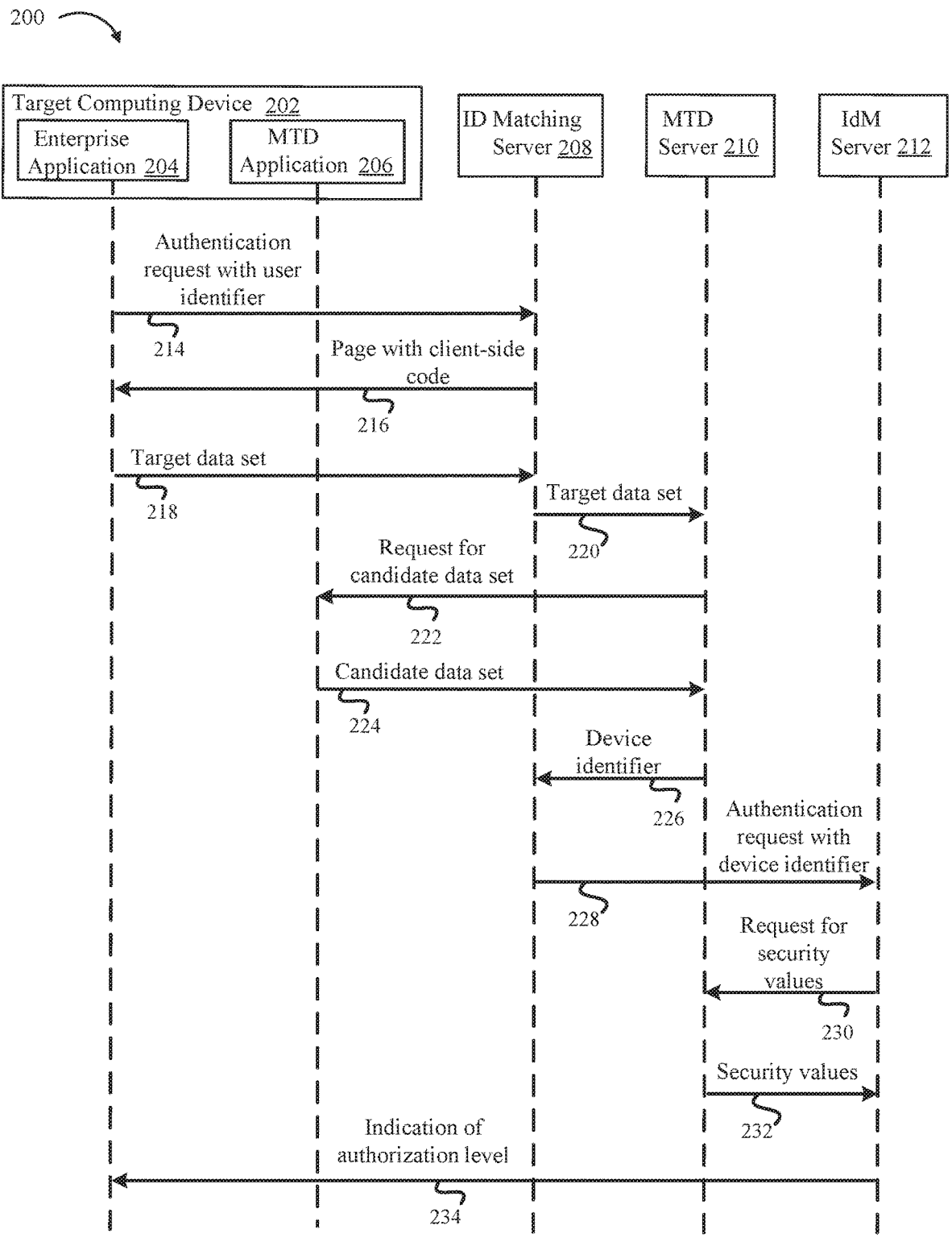
FIG. 2 is a signal diagram illustrating network messages in a process for application-to-application device identifier sharing, according to one embodiment.

FIG. 2 is a signal diagram 200 illustrating network messages in a process for application-to-application device identifier sharing, according to one embodiment. As shown, the signal diagram 200 illustrates communications sent between an enterprise application 204 executing at a target computing device 202, an MTD application 206 executing at the target computing device 202, an ID matching server 208, an MTD server 210, and an IdM server 212.

As shown at arrow 214, the enterprise application 204 sends an authentication request for a user to the ID matching server 208. The authentication request includes a user identifier that identifies a user who is attempting to log in to the enterprise application 204.

As shown at arrow 216, the ID matching server 208 sends a page to the enterprise application 204 in response to the authentication request. The page includes client-side code. The enterprise application 204 executes the client-side code in order to generate a target data set that characterizes the target computing device 202.

As shown at arrow 218, the enterprise application 204 sends the target data set to the ID matching server 208. If the ID matching server 208 finds an entry that maps the target data set to a device identifier in a relation, the communications indicated by arrows 220-226 may be skipped. Otherwise, the ID matching server 208 may proceed as indicated by arrow 220.

As shown at arrow 220, the ID matching server 208 sends the target data set to the MTD server 210 to request a device identifier associated with the target computing device 202.

As shown at arrow 222, the MTD server 210 sends a request to the MTD application 206 for a candidate data set that characterizes the target computing device 202. The request may include the same client-side code that was executed by the enterprise application 204 to generate the target data set. The MTD server 210 may also send similar requests to additional candidate devices (not shown) for additional candidate data sets. The MTD application 206 may execute the client-side code to generate the requested candidate data set.

As shown at arrow 224, the MTD application 206 sends the candidate data set that characterizes the target computing device 202 to the MTD server 210 in response to the request. By comparing the target data set to the candidate data set, the MTD server 210 determines that the candidate data set and the target data set were both collected on the target computing device 202. Based on this determination, the MTD server 210 may identify the device identifier that is associated with the target computing device 202 in a device profile.

As shown at arrow 226, the MTD server 210 sends the device identifier to the ID matching server 208.

As shown at arrow 228, the ID matching server 208 sends the authentication request with the device identifier to the IdM server 212.

As shown at arrow 230, the IdM server 212 sends a request for security values associated with the target computing device 202 to the MTD server 210. The IdM server 212 may include the device identifier in the request. The MTD server 210 may use the device identifier to look up the requested security values in the device profile that describes the target computing device 202.

As shown at arrow 232, the MTD server 210 sends the security values to the IdM server 212 in response to the request. Based on the security values, the IdM server 212 may determine an authorization level that applies while the user is logged in to the enterprise application 204 on the target computing device 202.

As shown at arrow 234, the IdM server 212 sends an indication of the authorization level to the enterprise application 204. The enterprise application 204 may enforce the authorization level accordingly.

Figure 3:
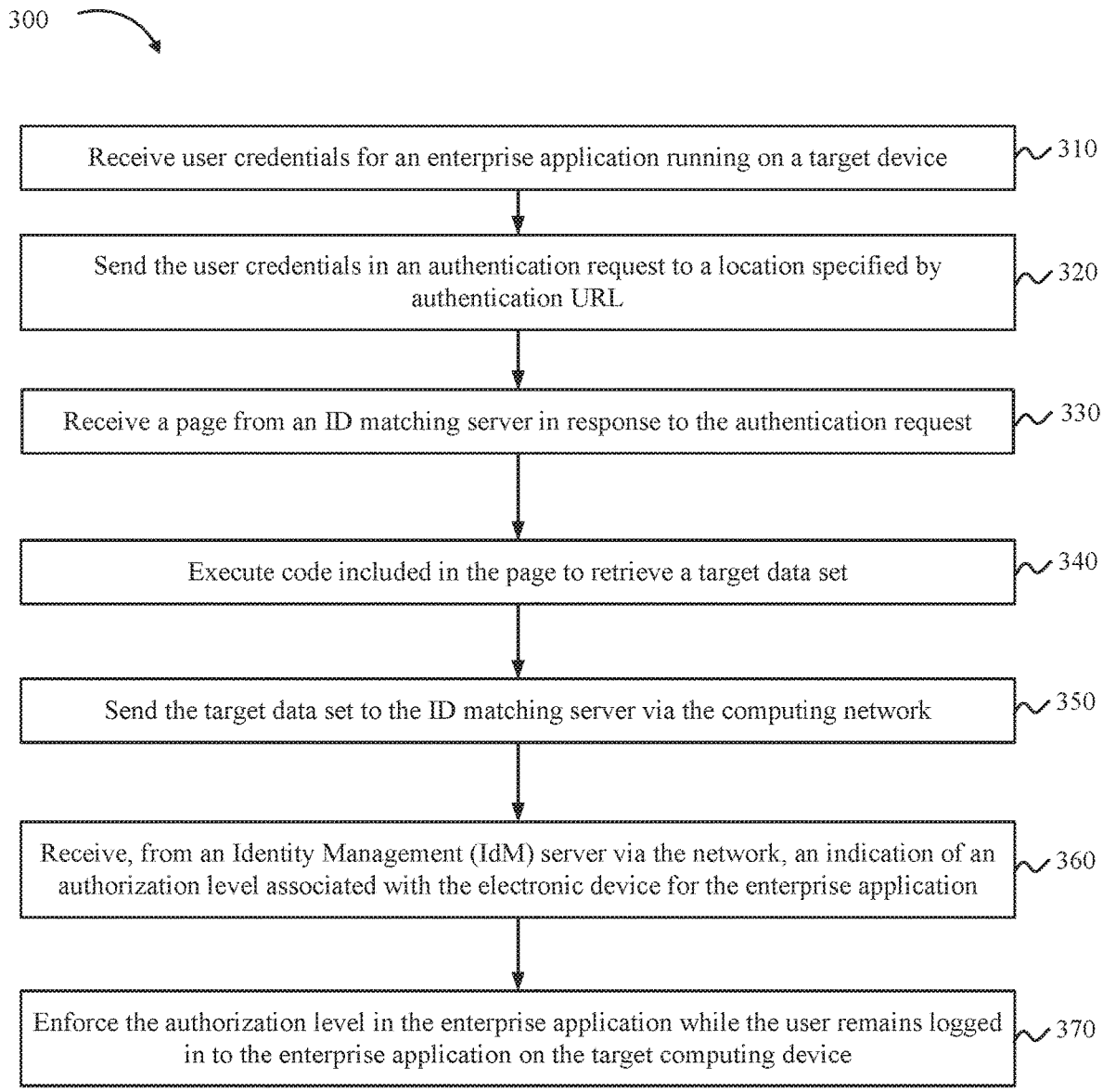
FIG. 3 is a flow diagram illustrating a process from the perspective of an enterprise application for application-to-application device identifier sharing, according to one embodiment.

FIG. 3 is a flow diagram illustrating a process 300 from the perspective of an enterprise application (e.g., enterprise application 112 or 204) for application-to-application device identifier sharing, according to one embodiment. The process 300 may be implemented as a method or may be executed as instructions on a machine (e.g., by one or more processors), where the instructions may be included on at least one computer-readable storage medium (e.g., a transitory or non-transitory computer-readable storage medium).

As shown in block 310, the enterprise application receives user credentials from a user for an enterprise application running on a target computing device (e.g., target computing device 110 or 202). The user credentials may be received from the user via an I/O device (e.g., I/O devices 114) associated with the target computing device.

As shown in block 320, the enterprise application sends the user credentials in an authentication request to a location specified by an authentication URL. The enterprise application may send the authentication request via a browser (e.g., embedded browser 116) embedded in the enterprise application via a computing network (e.g., the Internet).

As shown in block 330, the enterprise application receives a page from an ID matching server (e.g., ID matching server 120 or 208) in response to the authentication request. The page may be received via a computing network (e.g., network 102). The page may be located at the location addressed by the authentication URL. Alternatively, the enterprise application may be redirected from the location addressed by the authentication URL to the page. The enterprise application may receive the page via the computing network.

As shown in block 340, the enterprise application executes client-side code included in the page to retrieve a target data set characterizing the target computing device. The client-side code may be executed in a browser embedded in the enterprise application. The target data set may include properties of the target device, such as an IP address, a CPU class, a model number, a serial number, a screen size, a screen resolution, and other properties of the target computing device. The target data set may also include sensor data collected at the target computing device by a GPS, an IMU, an accelerometer, a gyroscope, a magnetometer, a microphone, and/or one or more other sensors.

As shown in block 350, the enterprise application sends the target data set to the ID matching server (e.g., via the computing network). Typically, the ID matching server and an MTD server (e.g., MTD server 140 or 210) may determine a device identifier for the target computing device without additional action from the enterprise application. However, in very rare cases, there may be more than one device that matches the target data set. In such cases, the enterprise application may receive a message from the ID matching server that triggers the enterprise application to a client-side MTD application instance (e.g., via a URL handler) at the target computing device to assist in determining the device identifier. The MTD application instance may send a communication to an MTD server indicating that the enterprise application is running on the same device as the MTD application instance.

As shown in block 360, the enterprise application receives an indication of an authorization level associated with the electronic device for the enterprise application from an IdM server (e.g., IdM server 130 or 212). The indication may be received via the computing network.

As shown in block 370, the enterprise application enforces the authorization level in the enterprise application while the user remains logged in to the enterprise application on the target computing device. For example, the enterprise application may receive (e.g., via an I/O device) a user request to access protected data from an electronic resource that is accessible through the enterprise application. If the enterprise application determines that the authorization level is insufficient to grant access to the protected data, the enterprise application may block access to the protected data.

Figure 4:
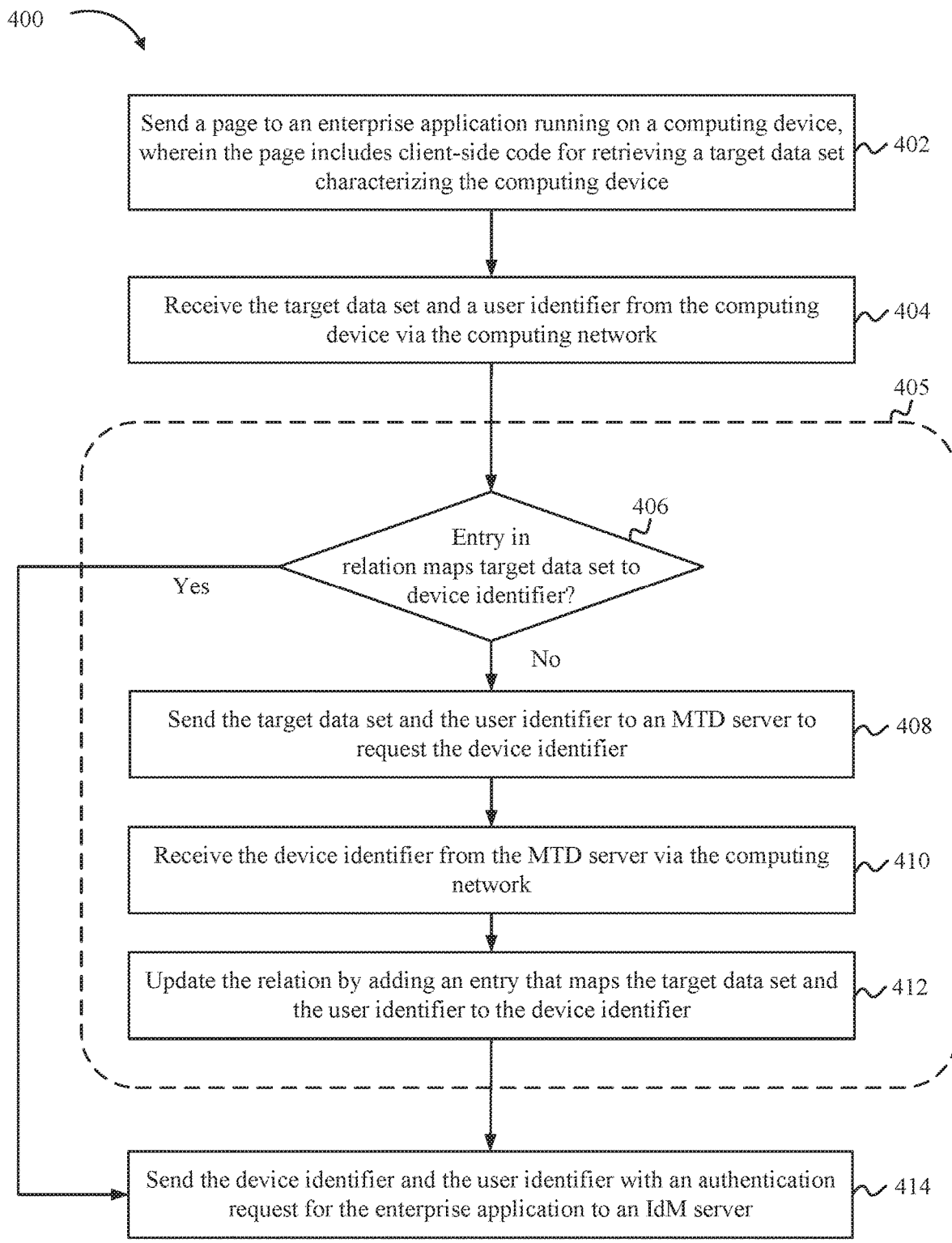
FIG. 4 is a flow diagram illustrating a process from the perspective of an ID matching server for application-to-application device identifier sharing, according to one embodiment.

FIG. 4 is a flow diagram illustrating a process 400 from the perspective of an ID matching server (e.g., ID matching server 120 or 208) for application-to-application device identifier sharing, according to one embodiment. The process 400 may be implemented as a method or may be executed as instructions on a machine (e.g., by one or more processors), where the instructions may be included on at least one computer-readable storage medium (e.g., a transitory or non-transitory computer-readable storage medium).

As shown in block 402, the ID matching server sends a page to an enterprise application (e.g., enterprise application 112) running on a computing device. The page may include client-side code that, when executed on the computing device, retrieves a target data set characterizing the computing device. The page may be sent via a computing network (e.g., network 102) to a browser embedded in the enterprise application (e.g., embedded browser 116).

As shown in block 404, the ID matching server receives the target data set and a user identifier from the computing device (e.g., via a computing network) after the client-side code is executed at the computing device. The target data set may include properties of the target device, such as an IP address, a CPU class, a model number, a serial number, a screen size, a screen resolution, and/or other properties of the target computing device. The target data set may also include sensor data collected at the target computing device by a GPS, an IMU, an accelerometer, a gyroscope, a magnetometer, a microphone, and/or one or more other sensors.

As shown in block 405, the ID matching server determines a device identifier for the computing device based on the target data set and the user identifier. Blocks 406-412 within block 405 illustrate operations that the ID matching server may perform to determine the device identifier.

As shown in block 406, the ID matching server determines whether an entry already exists that maps the target data set and the user identifier to the device identifier in a relation (e.g., relation 124). If so, the ID matching server proceeds to block 414. Otherwise, the ID matching server proceeds to block 408. The relation may be stored at the ID matching server or may be associated with the ID matching server in some other way (e.g., in a cloud infrastructure).

As shown in block 408, the ID matching server sends the target data set and the user identifier (e.g., via a computing network) to an MTD server (e.g., MTD server 140 or 210) to request the device identifier. Typically, the MTD server can determine a device identifier for the target computing device without additional action from the enterprise application. However, in very rare cases, there may be more than one device associated with the user that matches the target data set. In such cases, the ID matching server may send a message to the enterprise application that triggers the enterprise application to launch a client-side MTD application instance (e.g., via a URL handler) at the target computing device to assist in determining the device identifier. The MTD application instance may send a communication to the MTD server indicating that the enterprise application is running on the same device as the MTD application instance that sent the communication.

As shown in block 410, the ID matching server receives the device identifier from the MTD server (e.g., via the computing network) in response to sending the target data set and the user identifier.

As shown in block 412, the ID matching server updates the relation by adding an entry that maps the target data set and the user identifier to the device identifier. This will allow the ID matching server to skip blocks 408-412 the next time the user logs in to the enterprise application.

As shown in block 414, the ID matching server sends the device identifier and the user identifier with an authentication request for the enterprise application to an IdM server (e.g., via the network) to enable the IdM server to determine an authorization level for the user that applies to the enterprise application while the enterprise application executes on the computing device.

Figure 5:
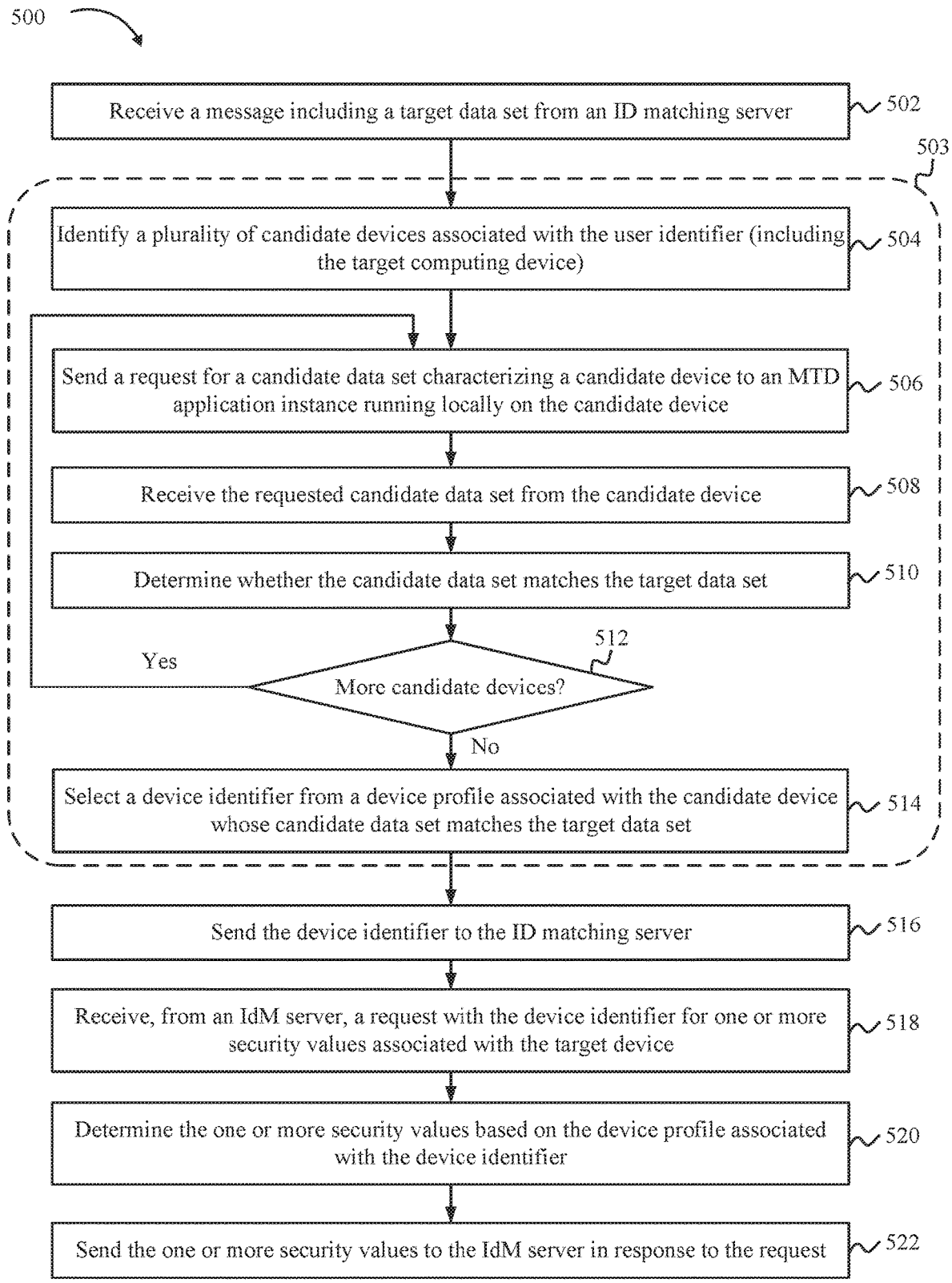
FIG. 5 is a flow diagram illustrating a process from the perspective of a Mobile Threat Defense (MTD) server for application-to-application device identifier sharing, according to one embodiment.

FIG. 5 is a flow diagram illustrating a process 500 from the perspective of an MTD server (e.g., MTD server 140 or 210) for application-to-application device identifier sharing, according to one embodiment. The process 500 may be implemented as a method or may be executed as instructions on a machine (e.g., by one or more processors), where the instructions may be included on at least one computer-readable storage medium (e.g., a transitory or non-transitory computer-readable storage medium).

At block 502, the MTD server receives a message (e.g., via a computing network, such as network 102) including a target data set from an ID matching server (e.g., ID matching server 120 or 208). The message may also include a user identifier. The target data set may characterize a target computing device (e.g., target computing device 110). Before arriving at the MTD server, the target data set may have been collected by an enterprise application (e.g., enterprise application 112) running on the target computing device. The target data set may include properties of the target device, such as an IP address, a CPU class, a model number, a serial number, a screen size, a screen resolution, and/or other properties of the target computing device. The target data set may also include sensor data collected at the target computing device by a GPS, an IMU, an accelerometer, a gyroscope, a magnetometer, a microphone, and/or one or more other sensors.

As shown in block 503, the MTD server determines a device identifier for the computing device based on the target data set and the user identifier. Blocks 504-514 within block 503 illustrate operations that the MTD server may perform to determine the device identifier.

At block 504, the MTD server identifies a plurality of candidate devices (e.g., candidate devices 160) associated with the user identifier. Although the MTD server has not yet finished determining which of the candidate devices is the target computing device, the plurality of candidate devices includes the target computing device because the target device is associated with the user identifier (e.g., in a device profile accessible to the MTD server).

At block 506, the MTD server sends a request for a candidate data set characterizing a candidate device to an MTD application instance running locally on the candidate device (e.g., via the network).

At block 508, the MTD server receives the requested candidate data set from the candidate device (e.g., via the network) in response to the request. The candidate data set may include the same types of properties found in the target data set, such as an IP address, a CPU class, a model number, a serial number, a screen size, a screen resolution, and/or other properties of the target computing device. The candidate data set may also include the same types of sensor data as the target data set, such as sensor data collected by a computing device by a GPS, an IMU, an accelerometer, a gyroscope, a magnetometer, a microphone, and/or another sensor at the candidate device.

At block 510, the MTD server determines whether the candidate data set matches the target data set. For example, the MTD server may compare a set of properties in a first candidate data set to a target set of properties in the target data set to determine whether the properties match. In addition, the MTD server may compare a sensor datum in the candidate data set to a sensor datum in the target data set to determine whether the difference between the sensor data exceeds a predefined threshold value.

At block 512, the MTD server determines whether there are any additional candidate devices in the plurality for which blocks 506-510 have not been performed. If there are such additional candidate devices, the MTD server repeats blocks 506-510 for the next candidate device in the plurality. Otherwise, the MTD server proceeds to block 516.

At block 514, the MTD server selects a device identifier from a device profile associated with the candidate computing device whose candidate data set matches the target data set (i.e., the target computing device as identified in an iteration of block 510).

Typically, the MTD server can determine a device identifier for the target computing device without additional action from the enterprise application. However, in very rare cases, there may be more than one device associated with the user that matches the target data set. In such cases, the MTD server may send a notification to the ID matching server indicating that the device identifier could not be determined based on the target data set. The ID matching server may send a message to the enterprise application that triggers the enterprise application to launch a client-side MTD application instance (e.g., via a URL handler) at the target computing device to assist in determining the device identifier. The MTD application instance may send a communication to the MTD server indicating that the enterprise application is running on the same device as the MTD application instance that sent the communication. Based on the communication, the MTD server can determine the device identifier for the target computing device.

At block 516, the MTD server sends the device identifier to the ID matching server in response to the message received in block 502 (e.g., via the network).

At block 518, the MTD server receives, from an IdM server (e.g., via the network), a request with the device identifier for one or more security values associated with the target device.

At block 520, the MTD server determines the one or more security values based on the device profile associated with the device identifier (i.e., the device profile of the target device). For example, the security values may be stored explicitly in the profile or may be derived from security data stored in the profile.

At block 522, the MTD server sends the one or more security values to the IdM server in response to the request received in block 518. The IdM server will use the security values to determine an authorization level for the user that applies to the enterprise application while the enterprise application executes on the target computing device.

Figure 6:
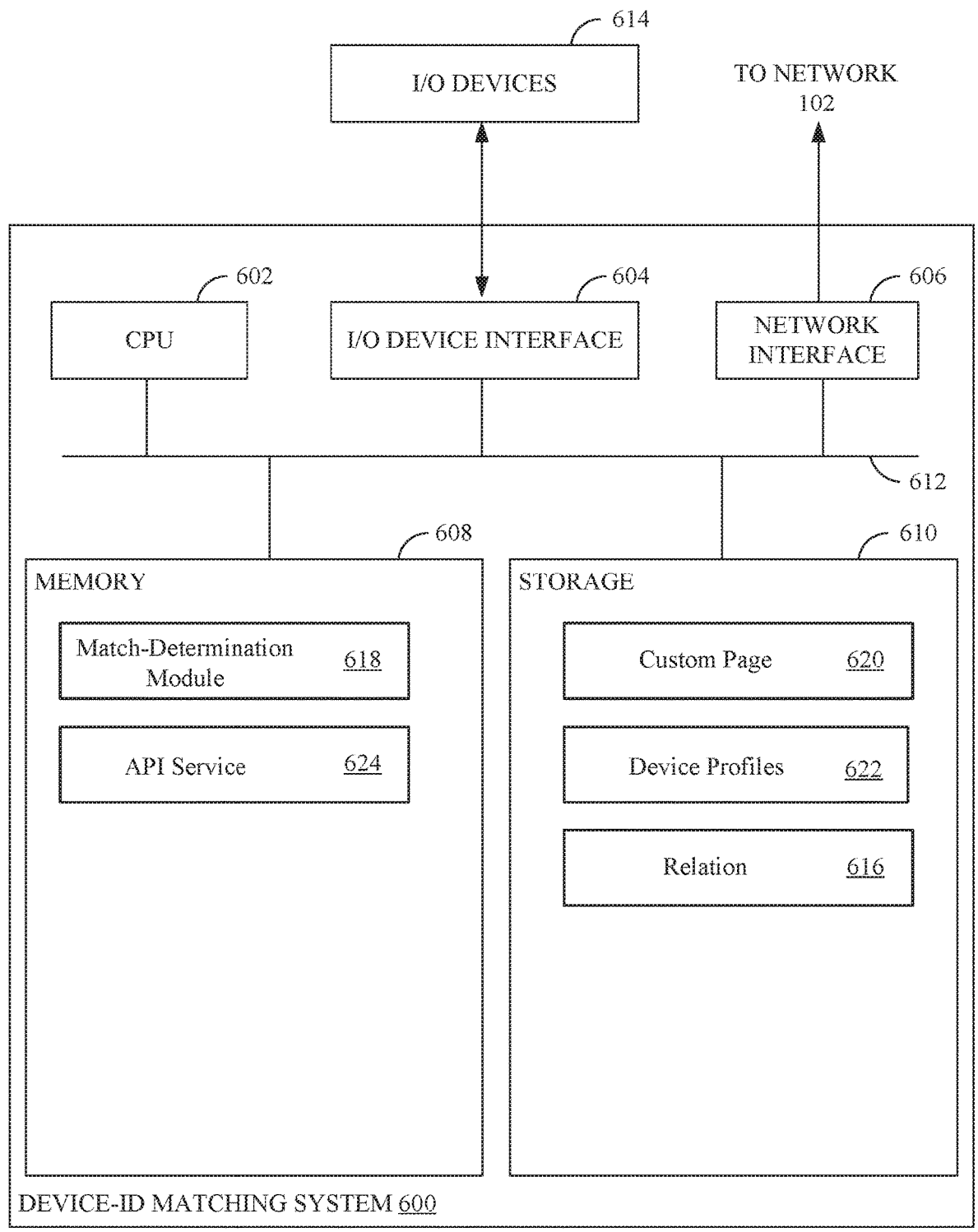
FIG. 6 illustrates an example device ID matching system, according to one embodiment.

FIG. 6 illustrates an example device-ID matching system 600, according to one embodiment. The device-ID matching system 600 may represent an example implementation of the device-ID matching server 120 of FIG. 1. As shown in FIG. 6, the device-ID matching system 600 includes, without limitation, a central processing unit (CPU) 602, one or more input/output (I/O) device interfaces 604 which may allow for the connection of various I/O devices 614 (e.g., keyboards, displays, mouse devices, pen input, etc.) to the device-ID matching system 600, network interface 606, a memory 608, storage 610, and an interconnect 612.

The CPU 602 may retrieve and execute programming instructions stored in the memory 608. Similarly, the CPU 602 may retrieve and store application data residing in the memory 608. The interconnect 612 may transmit programming instructions and application data, among the CPU 602, I/O device interface 604, network interface 606, memory 608, and storage 610. The CPU 602 can represent a single CPU, multiple CPUs, a single CPU having multiple processing cores, and the like. The memory 608 may represent random access memory (RAM), for example. Furthermore, the storage 610 may be a disk drive, for example. Although shown as a single unit, the storage 610 may be a combination of fixed and/or removable storage devices, such as fixed disk drives, removable memory cards or optical storage, network attached storage (NAS), or a storage area-network (SAN).

As shown, memory 608 includes a match-determination module 618 and an API service 624. As shown, storage 610 includes a custom page 620, device profiles 622, and a relation 616. The relation 616 may map data sets and user identifiers to device identifiers. The device profiles 622 may contain data describing devices that are known to the device-ID matching system 600. Each of the device profiles 622 may include a device identifier of a corresponding device.

In response to a login request from an enterprise application running at a target device, the match-determination module 618 may send the custom page 620 to an embedded browser of the enterprise application. The custom page 620 may include client-side code that, when executed, gathers target data that characterizes the target device. The embedded browser may execute the code and send the target data set and a user identifier to the device-ID matching system 600. If an entry in the relation 616 maps the target data set and the user identifier to a device identifier, the device-ID matching system 600 may (immediately) send the device identifier and the user identifier with the login request to an IdM server.

However, if no entry in the relation 616 maps the target data set and the user identifier to a device identifier, the match-determination module 618 may send a message to client-side MTD application instances running on a group of candidate devices that cannot be excluded from being the target device based on the target data set. Each of the candidate devices may have a corresponding profile in the device profiles 622. The message may request that each candidate device return a candidate data set describing itself. The message may include the same client-side code as the custom page 620.

In response, the MTD application instances may send the requested candidate data sets, respectively, to the match-determination module 618. The match-determination module 618 may determine which of the candidate devices is the target device by comparing the candidate data sets to the target data set and choosing the most likely match. After the target device has been identified, the device-ID matching system 600 may send the device identifier and the user identifier with the login request to the IdM server.

In response, the IdM server may send an API request for security information about the target device to the API service 624. The API request for security information may include the device identifier. The API service 624 may use the device identifier to identify a profile from the device profiles 622 that corresponds to the target device. The API service 624 may determine the security information based on the profile and send the security information to the IdM server in response to the API request to enable the IdM server to determine an authorization level for the user that applies to the enterprise application while the enterprise application executes on the target computing device.

Examples

The following examples pertain to further embodiments.

Example 1 includes a method for operating a client-side enterprise application. The method generally includes receiving, from a user via an input/output (I/O) device associated with a target computing device user credentials for an enterprise application running on the target computing device; sending, via a computing network, an authentication request to a location specified by an authentication uniform resource locator (URL), wherein the authorization request includes the user credentials; receiving, via the computing network, a page from an Identity (ID) matching server in response to the authentication request; executing, in the enterprise application, code included in the page to retrieve a target data set characterizing the target computing device; sending the target data set to the ID matching server via the computing network; receiving, from an Identity Management (IdM) server via the network, an indication of an authorization level associated with the electronic device for the enterprise application; and enforcing the authorization level in the enterprise application while the user remains logged in to the enterprise application on the target computing device.

Example 2 includes the method of example 1, wherein the target data set includes at least one of an Internet Protocol (IP) address, a central processing unit (CPU) class, a model number, a serial number, a screen size, or a screen resolution of the target computing device.

Example 3 includes the method of example 1 or 2, wherein the target data set includes sensor data from at least one of a global positioning system (GPS), an inertial measurement unit (IMU), an accelerometer, a gyroscope, a magnetometer, or a microphone.

Example 4 includes the method of example 1, 2, or 3, wherein the enterprise application comprises an embedded browser through which the authentication request is sent and in which the code is executed.

Example 5 includes the method of any of examples 1 to 4, further comprising: receiving a redirect message; and redirecting from the location specified by the authentication URL to the page in response to the redirect message.

Example 6 includes the method of any of examples 1 to 5, further comprising: receiving, from the ID matching server, an indication that the data set matches more than one device; triggering, via a browser embedded in the enterprise application and a uniform resource locator (URL) handler, a Mobile Threat Defense (MTD) application to send a message via the computing network to indicate that the enterprise application is running on the same computing device as the MTD application.

Example 7 includes the method of any of examples 1 to 6, wherein enforcing the authorization level in the enterprise application comprises: receiving, via the I/O device, a user request for protected data from an electronic resource accessible through the enterprise application; determining that the authorization level is insufficient to grant access to the protected data; and blocking access to the protected data based on the insufficiency of the authorization level.

Example 8 includes a method for operating an identity (ID) matching server. The method generally includes sending a page from an identity (ID) matching server via a computing network to an embedded browser of an enterprise application running on a computing device, wherein the page includes client-side code for retrieving a target data set characterizing the computing device; receiving the target data set and a user identifier from the computing device via the computing network; determining a device identifier for the computing device based on the target data set and the user identifier; and sending the device identifier and the user identifier with an authentication request for the enterprise application to an Identity Management (IdM) server via the network to enable the IdM server to determine an authorization level for the user that applies to the enterprise application while the enterprise application executes on the computing device.

Example 9 includes the method of example 8, wherein determining the device identifier for the computing device based on the set of data and the user identifier comprises: sending the target data set and the user identifier via the computing network to a Mobile Threat Defense (MTD) server to request the device identifier; and receiving the device identifier from the MTD server via the computing network in response to sending the target data set and the user identifier.

Example 10 includes the method of example 9, further comprising: updating a relation associated with the ID matching server by adding an entry that maps the target data set and the user identifier to the device identifier.

Example 11 includes the method of example 8, wherein determining the device identifier for the computing device based on the set of data and the user identifier comprises: identifying an entry in a relation associated with the ID matching server, wherein the entry maps the target data set and the user identifier to the device identifier.

Example 12 includes the method of example 8, wherein determining the device identifier for the computing device based on the set of data and the user identifier comprises: sending the target data set and the user identifier via the computing network to a Mobile Threat Defense (MTD) server to request the device identifier; receiving, via the network in response to sending the target data set and the user identifier, a notification from the MTD server indicating that more than one device associated with the user has a profile matching the target data set; and sending, via the network, a message to trigger the embedded browser to launch a Mobile Threat Defense (MTD) application at the computing device to assist in determining the device identifier.

Example 13 includes the method of any of examples 8 to 12, wherein the target data set includes at least one of an Internet Protocol (IP) address, a central processing unit (CPU) class, a model number, a serial number, a screen size, or a screen resolution of the target computing device.

Example 14 includes the method of any of examples 8 to 13, wherein the target data set includes sensor data from at least one of a global positioning system (GPS), an inertial measurement unit (IMU), an accelerometer, a gyroscope, a magnetometer, or a microphone.

Example 15 includes a method for operating a device-ID matching system. The method generally includes receiving, via a computing network from an identity (ID) matching server, a message that includes a user identifier for a user and a target data set collected by an enterprise application running on a target computing device, wherein the target data set characterizes the target computing device; determining a device identifier associated with the target computing device based on the user identifier and the target data set; sending the device identifier to the ID matching server via the computing network in response to the message; receiving, from an Identity Management (IdM) server via the network, a request for one or more security values associated with the target computing device, wherein the request includes the device identifier; determining the one or more security values based on a device profile associated with the device identifier; and sending the one or more security values to the IdM server via the network in response to the request to enable the IdM server to determine an authorization level for the user that applies to the enterprise application.

Example 16 includes the method of example 15, wherein determining the device identifier associated with the computing device comprises: identifying a plurality of candidate devices associated with the user identifier, wherein the plurality of candidate devices includes the target computing device; for each candidate device in the plurality of candidate devices: sending, via the computing network to an instance of a client-side Mobile Threat Defense (MTD) application running locally the candidate device, a request for a candidate data set characterizing the candidate device, and receiving, via the computing network from the candidate device in response to the request, the requested candidate data set.

Example 17 includes the method of example 16, wherein determining the device identifier associated with the computing device further comprises: comparing the candidate data sets received from the candidate devices to the target data set to determine which of the candidate devices is the target computing device; and selecting the device identifier from a device profile associated with the target computing device.

Example 18 includes the method of example 17, wherein comparing the candidate data sets received from the candidate devices to the target data set to determine which of the candidate devices is the target computing device comprises: comparing a set of properties in a first candidate data set to a target set of properties in the target data set; and upon determining the set of properties in the first candidate data set matches the target set of properties, identifying the candidate device from which the first candidate data set was received as the target device.

Example 19 includes the method of example 17 or 18, wherein comparing the candidate data sets received from the candidate devices to the target data set to determine which of the candidate devices is the target computing device comprises: comparing a first sensor datum in a first candidate data set to a second sensor datum in the target data set; and upon determining that a difference between the first sensor datum and the second sensor datum does not exceed a predefined threshold value, identifying the candidate device from which the first candidate data set was received as the target device.

Example 20 includes the method of example 16, wherein determining the device identifier associated with the computing device further comprises: comparing the candidate data sets to the target data set to determine which of the respective devices is the target computing device; determining, based on the comparison, that more than one of the candidate data sets matches the target data set; and sending a notification to the ID matching server indicating that the device identifier could not be determined based on the target data set.

Example 21 includes the method of any of examples 15 to 20, wherein the target data set includes at least one of an Internet Protocol (IP) address, a central processing unit (CPU) class, a model number, a serial number, a screen size, or a screen resolution of the target computing device.

Example 22 includes the method of any of examples 15 to 21, wherein the target data set includes sensor data from at least one of a global positioning system (GPS), an inertial measurement unit (IMU), an accelerometer, a gyroscope, a magnetometer, or a microphone.

While the foregoing is directed to embodiments of the present disclosure, other and further embodiments of the disclosure may be devised without departing from the basic scope thereof, and the scope thereof is determined by the claims that follow.

What is claimed is:

1. A method for operating a device-ID matching system, the method comprising:
    receiving, via a network from a first server, a message that includes a user identifier and a target data set collected by an enterprise application running on a target computing device, wherein the target data set characterizes the target computing device;
    determining a device identifier associated with the target computing device based on the user identifier and the target data set, wherein determining the device identifier includes:
        identifying a plurality of candidate devices associated with the user identifier, wherein the plurality of candidate devices includes the target computing device; and
        for each candidate device in the plurality of candidate devices:
            sending, via the network to an instance of a client-side Mobile Threat Defense (MTD) application running locally on the candidate device, a request for a candidate data set characterizing the candidate device; and
            receiving, via the network from the candidate device in response to the request for the candidate data set, the requested candidate data set;
    sending the device identifier to the first server via the network in response to the message;
    receiving, from a second server via the network, a request for one or more security values associated with the target computing device, wherein the request includes the device identifier;
    determining the one or more security values based on a device profile associated with the device identifier; and
    sending the one or more security values to the second server via the network in response to the request.

2. The method of claim 1, wherein determining the device identifier associated with the target computing device further comprises:
    comparing the candidate data sets received from the candidate devices to the target data set to determine which of the candidate devices is the target computing device; and
    determining the device identifier from a device profile associated with the target computing device.

3. The method of claim 2, wherein comparing the candidate data sets received from the candidate devices to the target data set to determine which of the candidate devices is the target computing device comprises:
    comparing a set of properties in a first candidate data set to a target set of properties in the target data set; and
    upon determining the set of properties in the first candidate data set matches the target set of properties, identifying the candidate device from which the first candidate data set was received as the target computing device.

4. The method of claim 2, wherein comparing the candidate data sets received from the candidate devices to the target data set to determine which of the candidate devices is the target computing device comprises:
    comparing a first sensor datum in a first candidate data set to a second sensor datum in the target data set; and
    upon determining that a difference between the first sensor datum and the second sensor datum does not exceed a predefined threshold value, identifying the candidate device from which the first candidate data set was received as the target computing device.

5. The method of claim 1, wherein determining the device identifier associated with the target computing device further comprises:
    comparing the candidate data sets to the target data set to determine which of the respective candidate devices is the target computing device;
    determining, based on the comparison, that more than one of the candidate data sets matches the target data set; and
    sending a notification to the first server indicating that the device identifier could not be determined based on the target data set.

6. The method of claim 1, wherein the target data set includes at least one of: an Internet Protocol (IP) address, a central processing unit (CPU) class, a model number, a serial number, a screen size, or a screen resolution of the target computing device.

7. A non-transitory computer-readable storage medium containing instructions that, when executed by one or more processors, perform an operation for operating a device-ID matching system, the operation comprising:
    receiving, via a network from a first server, a message that includes a user identifier and a target data set collected by an enterprise application running on a target computing device, wherein the target data set characterizes the target computing device;
    determining a device identifier associated with the target computing device based on the user identifier and the target data set, wherein determining the device identifier includes:
        identifying a plurality of candidate devices associated with the user identifier, wherein the plurality of candidate devices includes the target computing device; and
        for each candidate device in the plurality of candidate devices:
            sending, via the network to an instance of a client-side Mobile Threat Defense (MTD) application running locally on the candidate device, a request for a candidate data set characterizing the candidate device; and
            receiving, via the network from the candidate device in response to the request for the candidate data set, the requested candidate data set;
    sending the device identifier to the first server via the network in response to the message;

receiving, from a second server via the network, a request for one or more security values associated with the target computing device, wherein the request includes the device identifier;

determining the one or more security values based a device profile associated with the device identifier; and sending the one or more security values to the second server via the network in response to the request.

8. The non-transitory computer-readable storage medium of claim 7, wherein determining the device identifier associated with the target computing device further comprises:

comparing the candidate data sets received from the candidate devices to the target data set to determine which of the candidate devices is the target computing device; and determining the device identifier from a device profile associated with the target computing device.

9. The non-transitory computer-readable storage medium of claim 8, wherein comparing the candidate data sets received from the candidate devices to the target data set to determine which of the candidate devices is the target computing device comprises:

comparing a set of properties in a first candidate data set to a target set of properties in the target data set; and upon determining the set of properties in the first candidate data set matches the target set of properties, identifying the candidate device from which the first candidate data set was received as the target computing device.

10. The non-transitory computer-readable storage medium of claim 8, wherein comparing the candidate data sets received from the candidate devices to the target data set to determine which of the candidate devices is the target computing device comprises:

comparing a first sensor datum in a first candidate data set to a second sensor datum in the target data set; and upon determining that a difference between the first sensor datum and the second sensor datum does not exceed a predefined threshold value, identifying the candidate device from which the first candidate data set was received as the target computing device.

11. The non-transitory computer-readable storage medium of claim 7, wherein determining the device identifier associated with the target computing device further comprises:

comparing the candidate data sets to the target data set to determine which of the respective candidate devices is the target computing device;

determining, based on the comparison, that more than one of the candidate data sets matches the target data set; and sending a notification to the first server indicating that the device identifier could not be determined based on the target data set.

12. The non-transitory computer-readable storage medium of claim 7, wherein the target data set includes at least one of: an Internet Protocol (IP) address, a central processing unit (CPU) class, a model number, a serial number, a screen size, or a screen resolution of the target computing device.

13. A system comprising:

one or more processors; and a memory storing one or more applications that, when executed on the one or more processors, perform an operation for operating a device-ID matching system, the operation comprising:

receiving, via a network from a first server, a message that includes a user identifier and a target data set collected by an enterprise application running on a target computing device, wherein the target data set characterizes the target computing device;

determining a device identifier associated with the target computing device based on the user identifier and the target data set, wherein determining the device identifier includes:

identifying a plurality of candidate devices associated with the user identifier, wherein the plurality of candidate devices includes the target computing device; and for each candidate device in the plurality of candidate devices:

sending, via the network to an instance of a client-side Mobile Threat Defense (MTD) application running locally on the candidate device, a request for a candidate data set characterizing the candidate device; and receiving, via the network from the candidate device in response to the request for the candidate data set, the requested candidate data set;

sending the device identifier to the first server via the network in response to the message;

receiving, from a second server via the network, a request for one or more security values associated with the target computing device, wherein the request includes the device identifier;

determining the one or more security values based a device profile associated with the device identifier; and sending the one or more security values to the second server via the network in response to the request.

14. The system of claim 13, wherein determining the device identifier associated with the target computing device further comprises:

comparing the candidate data sets received from the candidate devices to the target data set to determine which of the candidate devices is the target computing device; and determining the device identifier from a device profile associated with the target computing device.

15. The system of claim 14, wherein comparing the candidate data sets received from the candidate devices to the target data set to determine which of the candidate devices is the target computing device comprises:

comparing a set of properties in a first candidate data set to a target set of properties in the target data set; and upon determining the set of properties in the first candidate data set matches the target set of properties, identifying the candidate device from which the first candidate data set was received as the target computing device.

16. The system of claim 14, wherein comparing the candidate data sets received from the candidate devices to the target data set to determine which of the candidate devices is the target computing device comprises:

comparing a first sensor datum in a first candidate data set to a second sensor datum in the target data set; and upon determining that a difference between the first sensor datum and the second sensor datum does not exceed a predefined threshold value, identifying the candidate device from which the first candidate data set was received as the target computing device.

17. The system of claim 13, wherein determining the device identifier associated with the target computing device further comprises:
- comparing the candidate data sets to the target data set to determine which of the respective candidate devices is the target computing device;
- determining, based on the comparison, that more than one of the candidate data sets matches the target data set; and
- sending a notification to the first server indicating that the device identifier could not be determined based on the target data set.

* * * * *

UNITED STATES PATENT AND TRADEMARK OFFICE
CERTIFICATE OF CORRECTION

PATENT NO. : 10,621,337 B1
APPLICATION NO. : 15/787104
DATED : April 14, 2020
INVENTOR(S) : Adi Sharabani et al.

Page 1 of 1

It is certified that error appears in the above-identified patent and that said Letters Patent is hereby corrected as shown below:

On the Title Page

In Column 1, item (71), Applicant, Lines 1-2, delete "Symantec Corporation, Mountain View," and insert -- CA, Inc., San Jose, CA (US) --, therefor.

Signed and Sealed this
Sixteenth Day of June, 2020

Andrei Iancu
*Director of the United States Patent and Trademark Office*